United States Patent
Tamir et al.

(10) Patent No.: US 9,655,167 B2
(45) Date of Patent: *May 16, 2017

(54) WIRELESS PERIPHERAL INTERCONNECT BUS

(75) Inventors: Tal Tamir, Even Yehuda (IL); Daniel Rettig, Karkur (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,110

(22) Filed: Sep. 23, 2011

(65) Prior Publication Data

US 2012/0017015 A1 Jan. 19, 2012

Related U.S. Application Data

(63) Continuation of application No. 12/034,645, filed on Feb. 20, 2008, now Pat. No. 8,050,290.

(60) Provisional application No. 60/938,190, filed on May 16, 2007.

(51) Int. Cl.
*H04B 7/00* (2006.01)
*H04W 99/00* (2009.01)

(52) U.S. Cl.
CPC .................................. *H04W 99/00* (2013.01)

(58) Field of Classification Search
USPC ....... 370/466, 476, 389, 401, 310, 312, 277; 455/414.1, 462; 710/106, 107
See application file for complete search history.

(56) References Cited

U.S. PATENT DOCUMENTS

| | | |
|---|---|---|
| 4,862,454 A | 8/1989 | Dias et al. |
| 5,825,617 A | 10/1998 | Kochis et al. |
| 5,923,757 A | 7/1999 | Hocker et al. |
| 5,926,629 A | 7/1999 | Gulick |
| 5,930,368 A | 7/1999 | Hocker et al. |
| 6,170,026 B1 | 1/2001 | Kimura et al. |
| 6,226,700 B1 | 5/2001 | Wandler et al. |
| 6,396,809 B1 | 5/2002 | Holden et al. |
| 6,499,079 B1 | 12/2002 | Gulick |

(Continued)

FOREIGN PATENT DOCUMENTS

| | | |
|---|---|---|
| TW | 200709616 | 3/2007 |
| WO | WO-0111476 A1 | 2/2001 |

OTHER PUBLICATIONS

Chiang J., et al., "Advanced Switching Versus PCI-Express for Peer-to-Peer Communications," May 2004, ASI-SIG, Vitesse Semiconductor Corp., Camarillo, CA. Retrieved Mar. 12, 2009.

(Continued)

*Primary Examiner* — Yemane Mesfin
*Assistant Examiner* — Henry Baron
(74) *Attorney, Agent, or Firm* — Patterson & Sheridan

(57) ABSTRACT

A wireless peripheral interconnect bus capable of providing a high rate data transfer between peripheral devices and a host bridge of a computing device over a wireless medium comprises a first wireless pair for transferring data between a first peripheral component and a second peripheral component, wherein the first wireless pair implements at least a layered protocol; and a second wireless pair for transferring data between a second peripheral component and the first peripheral component, wherein the second wireless pair implements at least a layered protocol.

20 Claims, 5 Drawing Sheets

(56) References Cited

U.S. PATENT DOCUMENTS

| | | |
|---|---|---|
| 6,798,775 B1 | 9/2004 | Bordonaro et al. |
| 6,898,766 B2 | 5/2005 | Mowery et al. |
| 6,937,468 B2 | 8/2005 | Lin et al. |
| 7,058,738 B2 | 6/2006 | Stufflebeam, Jr. |
| 7,079,544 B2 | 7/2006 | Wakayama et al. |
| 7,096,310 B2 | 8/2006 | Norden et al. |
| 7,293,129 B2 | 11/2007 | Johnsen et al. |
| 7,320,080 B2 | 1/2008 | Solomon et al. |
| 7,340,555 B2 | 3/2008 | Ashmore et al. |
| 7,356,635 B2 | 4/2008 | Woodings et al. |
| 7,363,404 B2 | 4/2008 | Boyd et al. |
| 7,467,313 B2 | 12/2008 | Han et al. |
| 7,469,366 B1 | 12/2008 | Reed |
| 7,519,761 B2 | 4/2009 | Gregg |
| 7,525,986 B2 | 4/2009 | Lee et al. |
| 7,543,096 B2 | 6/2009 | Davies et al. |
| 7,596,646 B2* | 9/2009 | Kim et al. ............... 710/72 |
| 7,916,750 B2 | 3/2011 | Sharma et al. |
| 8,006,014 B2 | 8/2011 | Lai et al. |
| 8,050,290 B2 | 11/2011 | Tamir et al. |
| 8,374,157 B2 | 2/2013 | Tamir et al. |
| 8,472,436 B2 | 6/2013 | Meiri et al. |
| 2002/0080756 A1* | 6/2002 | Coppola et al. .......... 370/338 |
| 2002/0138565 A1* | 9/2002 | Kustov et al. ............ 709/203 |
| 2003/0198015 A1 | 10/2003 | Vogt |
| 2003/0219034 A1* | 11/2003 | Lotter ............ H04L 41/0823 370/469 |
| 2004/0122771 A1 | 6/2004 | Celi et al. |
| 2004/0208130 A1 | 10/2004 | Mizutani et al. |
| 2004/0220803 A1 | 11/2004 | Chiu et al. |
| 2005/0047079 A1 | 3/2005 | Gasbarro et al. |
| 2005/0075080 A1 | 4/2005 | Zhang |
| 2005/0220173 A1 | 10/2005 | Zyren et al. |
| 2005/0246470 A1 | 11/2005 | Brenner |
| 2005/0248502 A1 | 11/2005 | Okuley et al. |
| 2005/0262269 A1 | 11/2005 | Pike |
| 2005/0278756 A1* | 12/2005 | Brown ...................... 725/80 |
| 2006/0050707 A1 | 3/2006 | Sterin |
| 2006/0061963 A1 | 3/2006 | Schrum |
| 2006/0080722 A1 | 4/2006 | Santhoff |
| 2006/0126612 A1* | 6/2006 | Sandy et al. ............. 370/389 |
| 2006/0129709 A1 | 6/2006 | Bandholz et al. |
| 2006/0143338 A1 | 6/2006 | Hunsaker et al. |
| 2006/0206655 A1 | 9/2006 | Chappell et al. |
| 2006/0222125 A1 | 10/2006 | Edwards, Jr. et al. |
| 2006/0233191 A1 | 10/2006 | Pirzada et al. |
| 2006/0251096 A1 | 11/2006 | Metsker |
| 2007/0067551 A1 | 3/2007 | Ikeda et al. |
| 2007/0173202 A1 | 7/2007 | Binder et al. |
| 2007/0189270 A1 | 8/2007 | Borislow et al. |
| 2007/0198763 A1 | 8/2007 | Suzuki et al. |
| 2007/0283181 A1 | 12/2007 | Shelton et al. |
| 2007/0291636 A1 | 12/2007 | Rajagopal et al. |
| 2008/0018491 A1* | 1/2008 | Berkman et al. ....... 340/870.02 |
| 2008/0071961 A1 | 3/2008 | Higuchi et al. |
| 2008/0147904 A1 | 6/2008 | Freimuth et al. |
| 2008/0219376 A1* | 9/2008 | Qi et al. .................. 375/285 |
| 2009/0024782 A1 | 1/2009 | Elboim |
| 2013/0124762 A1 | 5/2013 | Tamir et al. |

OTHER PUBLICATIONS

Digital-Logic AG: "Solution Guide Embedded Computer 2008, vol. II" (Fall issue), Sep. 5, 2008,Digital-Logic AG, Switzerland, Retrieved date Oct. 8, 2009.

International Search Report and the Written Opinion of the International Searching Authority for the corresponding International Application No. PCT/US2008/070405, dated Jan. 28, 2009.

PC/104 Embedded Consortium: "What is PCI/104-Express (TM)?", Rev. A, published Apr. 3, 2008.

PCI Express Base Specification Revision 1.0 Jul. 22, 2002.

PCI Express* Ethernet Networking, Sep. 2005 Intel White Paper.

* cited by examiner

WIRELESS PERIPHERAL INTERCONNECT BUS

CROSS-REFERENCE TO RELATED APPLICATIONS

This application is a continuation application of U.S. patent application Ser. No. 12/034,645, filed on Feb. 20, 2008, now allowed, which claims the benefit of U.S. Provisional Application No. 60/938,190 filed on May 16, 2007. The above-referenced applications are incorporated herein in their entirely by reference thereto.

TECHNICAL FIELD

The present invention relates generally to peripheral component interconnect buses.

BACKGROUND OF THE INVENTION

Peripheral component interconnect PCI Express (or "PCIe") is a high performance, generic and scalable system interconnect bus for a wide variety of applications ranging from personal computers to embedded applications. PCIe implements a serial, full duplex, multi-lane, point-to-point interconnect, packet-based, and switch based technology. Current versions of PCIe buses allow for a transfer rate of 2.5 Gb/Sec per lane, with a total of 32 lanes.

FIG. 1 shows an illustration of a typical architecture 100 of a computing device that includes a PCIe fabric. A host bridge 110 is coupled to endpoints 120, a CPU 130, a memory 140, and a switch 150. The peripheral components are connected through endpoints 120-1 to 120-N (120). Multiple point-to-point connections are accomplished by the switch 150, which provides the fanout for the I/O bus. The switch 150 provides peer-to-peer communication between different endpoints 120. That is, traffic between the switch 150 and endpoints 120 that does not involve cache-coherent memory transfers, is not forwarded to the host bridge 110. The switch 150 is shown as a separate logical element but it could be integrated into the host bridge 110.

As depicted in FIG. 2 the PCIe is a layered protocol bus, consisting of a transaction layer 210, a data link layer 220, and a physical layer 230. The PCIe implements split transactions, i.e., transactions with request and response separated by time, allowing the link to carry other traffic while the target device gathers data for the response. With this aim, the primary function of the transaction layer 210 is to assemble and disassemble transaction layer packets (TLPs). TLPs are used to carry transactions, where each TLP has a unique identifier that enables a response directed at the originator. The data link layer 220 acts as an intermediate between the transaction layer 210 and the physical layer 230 and provides a reliable mechanism for exchanging TLPs. The data link layer 220 implements error checking (known as "LCRC") and retransmission mechanisms. LCRC and sequencing are applied on received TLPs and if an error is detected, a data link retry is activated. The physical layer 230 consists of an electrical sub-layer 234 and logical sub-layer 232. The sub-layer 232 is a transmitter and receiver pair implementing symbol mapping, serialization and de-serialization of data. At the electrical sub-layer 234, each lane utilizes two unidirectional low-voltage differential signaling (LVDS) pairs at 2.5 Gbit/s or 5 Gbit/s for transmit and receive symbols from the logical sub-block 232.

In the current technology, peripheral components are physically coupled to the PCIe. To wirelessly connect the peripheral devices a new protocol has to be defined. For example, the UWB is a wireless technology for USB, and Wi-Fi is a standard for Ethernet connection. However, each such wireless interconnect solution can only support the connectivity of a limited set of peripheral devices. For example, the Wi-Fi standard aims to decouple Ethernet cards and the UWB allows the wireless connection of USB devices, such as a mouse, a keyboard, a printer and the like.

It would be therefore highly advantageous to provide a solution that enables the wireless connection between all types of peripheral devices to the computing device.

SUMMARY OF THE INVENTION

Certain embodiments disclosed herein include a wireless peripheral interconnect bus capable of providing a high rate data transfer between peripheral devices and a host bridge of a computing device over a wireless medium. The wireless peripheral interconnect bus comprises a first wireless pair for transferring data from a first peripheral component to a second peripheral component and receiving data transmitted from the second peripheral component to the first peripheral component, wherein the first wireless pair implements at least a layered protocol; and a second wireless pair for transferring data from the second peripheral component and the first peripheral component and receiving data transmitted from the first peripheral component to a second peripheral component, wherein the second wireless pair implements at least a layered protocol.

Certain embodiments disclosed herein also include a wireless peripheral component interconnect PCI Express (PCIe) fabric. The PCI Express (PCIe) fabric comprises a switch coupled to a host bridge of a computing device and a plurality of PCIe endpoints; a first wireless pair of a wireless peripheral interconnect bus connected to the switch; and a second wireless pair of a wireless peripheral interconnect bus connected to a PCIe component, wherein the first wireless pair and the second wireless pair communicates over a wireless link.

DETAILED DESCRIPTION OF THE INVENTION

Figure 1:
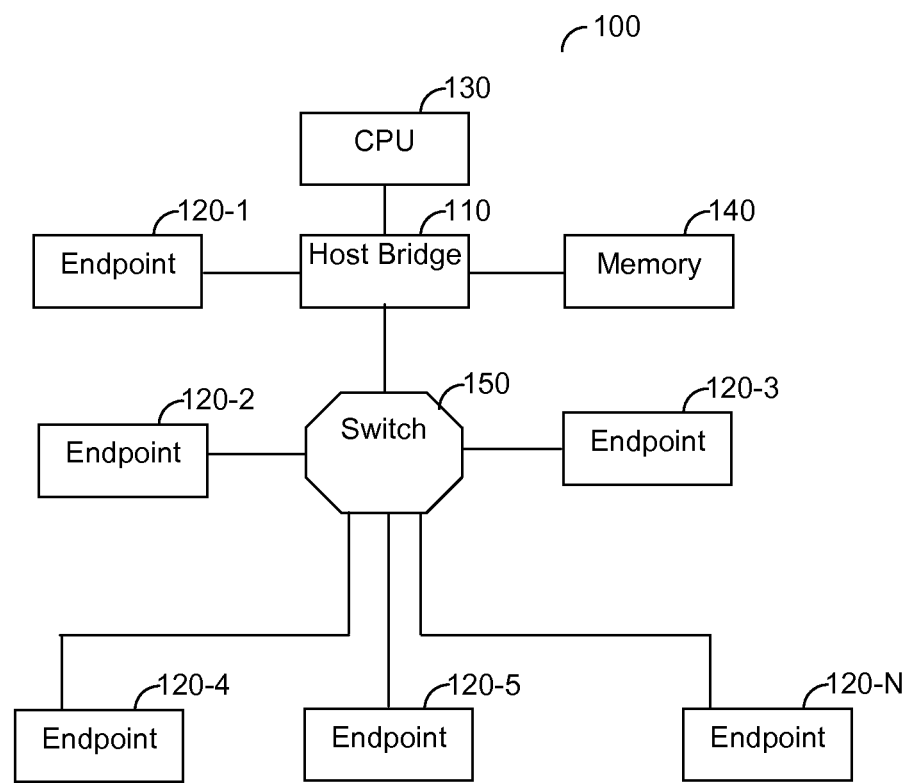
FIG. 1 is a block diagram showing a conventional architecture of a computer computing device.
Figure 2:
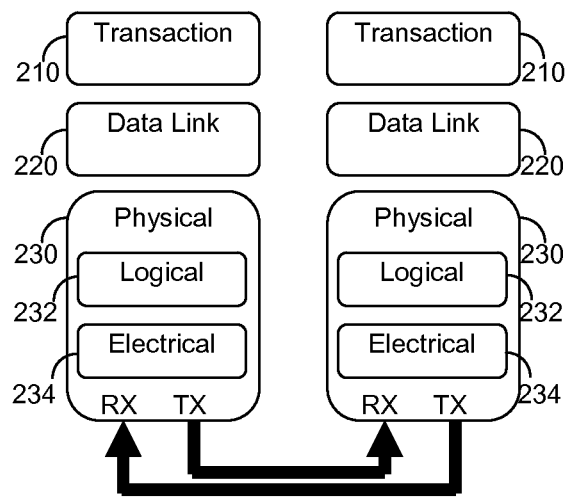
FIG. 2 is a diagram of layered protocol of a conventional PCIe bus.

This disclosure describes the best mode or modes of practicing the invention as presently contemplated. It is important to note that these embodiments are only examples to advise one of ordinary skill in the art of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the various views of the drawings, like reference characters designate like or similar parts.

Figure 3:
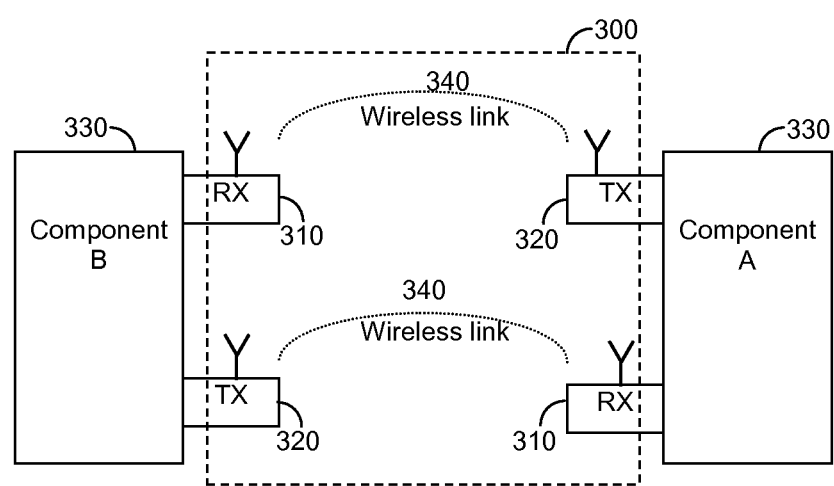
FIG. 3 is a diagram of a wireless peripheral interconnect bus realized in accordance with an embodiment of the invention.

FIG. 3 shows an exemplary and non-limiting diagram of a wireless peripheral interconnect bus 300 implemented in accordance with one embodiment of the invention. The operation of the wireless peripheral interconnect bus 300 will be described with reference to a specific non-limiting embodiment where the bus 300 is a PCIe. In this embodiment, the wireless bus 300 implements a standard PCIe over the air by replacing the low-voltage differential signaling (LVDS) pairs with two wireless links 340. Each wireless link 340 includes a wireless receiver 310 and a wireless transmitter 320, which are coupled to PCIe components 330. A PCIe component 330 may be an endpoint (e.g., endpoint 120), a switch (e.g., switch 150), a host bridge (e.g., bridge 110), and so on. The endpoints can be utilized to provide for a connection to any type of peripheral devices including, but not limited to, storage devices, displays, projectors, monitors, input devices, PDAs, printers, optical disks, and so on.

A wireless link 340 is unidirectional and capable of transferring data at a high rate with limited latency. As a non-limiting example, the wireless bus 300 enables a transfer data rate of 2.5 Gb/s per lane over an unlicensed frequency band such as 57-64 GHz or 5-6 GHz. The links 340 aggregate an unbound number of PCIe lanes, for example, the number of aggregated lanes is 32. The wireless receiver 310 and wireless transmitter 320 implement a wireless modem, such as an orthogonal frequency division multiplexing (OFDM) modem, a single-carrier modem, a multi-carrier modem, and the like. Furthermore, the wireless receiver 310 and wireless transmitter 320 can implement sophisticated communication techniques, such as multiple-input-multiple-output (MIMO), beam forming, advanced coding, space time block codes, and so on.

Figure 4:
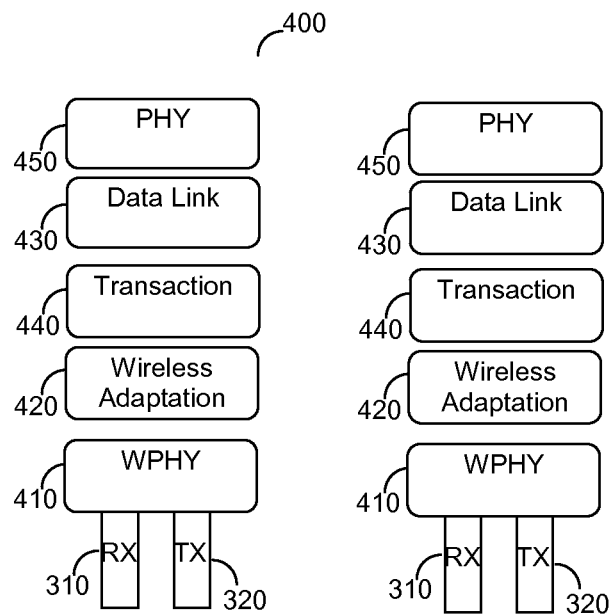
FIG. 4 is a diagram of layered protocol of a wireless peripheral interconnect bus implemented in accordance with an embodiment of the invention.

The wireless peripheral interconnect bus 300 also supports a layered protocol such as the PCIe. Specifically, as illustrated in FIG. 4, the layered protocol 400 of the wireless peripheral interconnect bus 300 includes two new layers: a wireless physical (WPHY) layer 410 and a wireless adaptation layer 420. The layer protocol 400 also comprises a data link layer 430, a transaction layer 440, and a physical layer 450. The layers 430, 440 and 450 have functionality similar to the transaction layer 210, data link layer 220, and physical layer 230 described in greater detail above.

The wireless adaptation layer 420 controls and manages the access to the wireless link 340 in either a full-duplex or half-duplex mode of operation. Specifically, the wireless adaptation layer 420 is responsible for accessing the link and serves as a medium access controller (MAC), by establishing the link between the components 330 and preferably using authentication and encryption techniques to secure the established link.

Figure 5A:
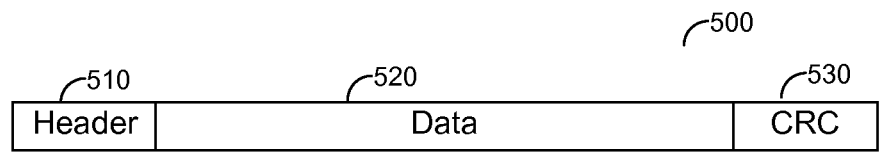
FIG. 5A is a diagram of a WPAP structure.

In accordance with one embodiment of the present invention, the adaptation layer 420 receives transaction layer packets (TLPs) from the transaction link layer 440 and assembles the TLPs in a wireless PCIe adaptation packet (WPAP). An exemplary structure of a WPAP 500 as generated by the wireless adaptation layer 420 is provided in FIG. 5A. The WPAP 500 includes a header field 510, a data portion 520 and a cyclic redundancy check (CRC) field 530 with the CRC code computed for the data portion 520. The header may include a source address, a destination address, a lane ID, a peripheral component ID, or any other type of information used for managing the wireless link 340. The wireless adaptation layer 420 may also perform aggregation of TPLs for better efficiency. The CRC code is utilized to reduce the error rate of the wireless adaptation layer 420, as the error rate in data transmitted over a wireless medium is higher than data transferred by means of wires. Therefore, the adaptation layer further provides a reliable link for the transaction link layer 440.

Figure 5B:
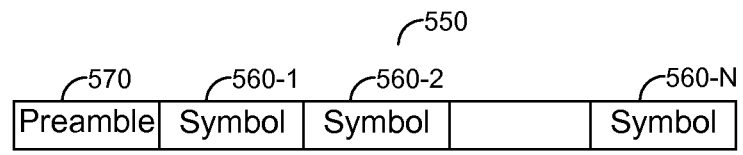
FIG. 5B is a diagram of a WPHY frame structure.

The WPHY layer 410 receives the WPAP 500 and constructs a WPHY frame 550, such as shown in FIG. 5B. The WPHY frame 550 includes a plurality of symbols 560-1 to 560-N, such as OFDM or other modulation symbols and a preamble field 570. The preamble field 570 is a predefined sequence utilized for signal detection, energy measurements, time, frequency and phase synchronization, channel estimation, antenna steering, calibrations, and so on. Different types of preambles may be defined, each of which has different characteristics. For example, a short preamble and a long preamble can be defined, where the long preamble is used for antenna steering and the short preamble is used to increase the link efficiency. Each symbol 560 includes at least one WPAP 500.

Both the wireless adaptation layer 420 and the WPHY layer 410 in the transmitter 320 and receiver 310 apply a re-transmission mechanism to ensure a reliable wireless link. In one embodiment, the transmitter maintains a retransmission buffer to include all packets that have not been acknowledged by the receiver 310, and non-acknowledged packets are retransmitted by the transmitter 320. The WPHY layer 410 controls the transmission rate of re-transmitted symbols 560 in order to avoid situations of the transmitting of out-of-order TLPs provided by the transaction link layer 440.

Figure 6:
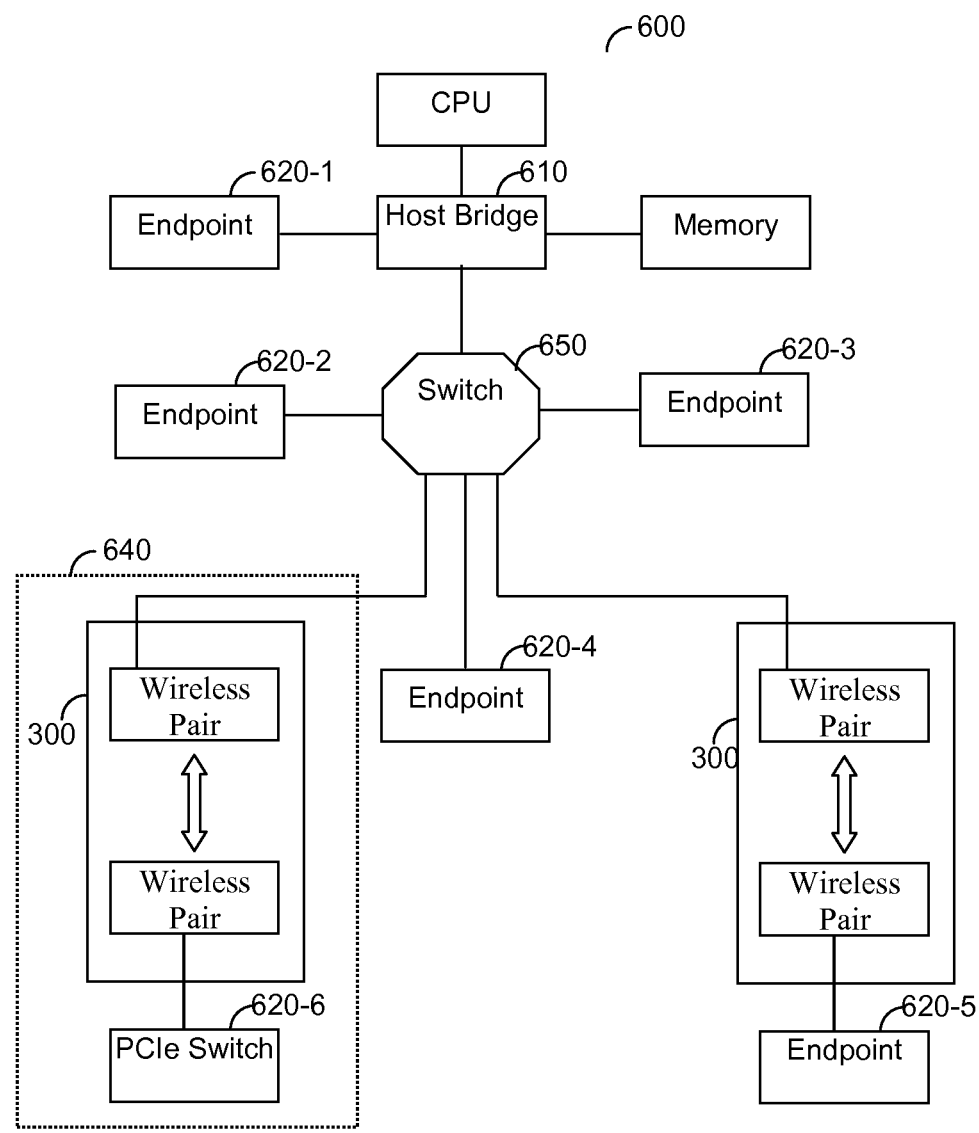
FIG. 6 is a block diagram of a wireless PCIe fabric constructed according to an embodiment of the invention.

In accordance with one embodiment of the invention the wireless bus 300 can be integrated in a computing device to wirelessly connect a plurality of peripheral components to the device. The computing device may be, but is not limited to, a personal computer, a laptop, a media player, a mobile phone, a personal digital assistant (PDA), and the like. FIG. 6 is a block diagram of a fabric 600 used for connecting peripheral components using a wireless peripheral interconnect bus 300 constructed in accordance with the principles of the invention.

The host bridge 610 identifies wireless peripheral interconnect bus 300 as a standard bus terminator (e.g., a PCIe endpoint, a PCIe switch, etc.). A first wireless pair of the bus 300 is connected to a switch 650 and a second wireless pair of the bus 300 is coupled to an endpoint 620-5. Therefore, data is transferred between the switch 650 and endpoint 620-5 over a wireless link (e.g., link 340), where the underlying wireless specifics are transparent to any component connected to fabric 600. Each wireless pair of the bus 300 includes a wireless receiver and transmitter and implements a layered protocol as discussed in greater detail above. The endpoint 620-5 may be, but is not limited to, a legacy endpoint, a PCIe endpoint, and so on. The fabric 600 may further include a wireless peripheral interconnect switch 640 formed by coupling a first wireless pair of the bus 300 to the switch 650 and a second wireless pair to a PCIe switch 620-6.

Figure 7:
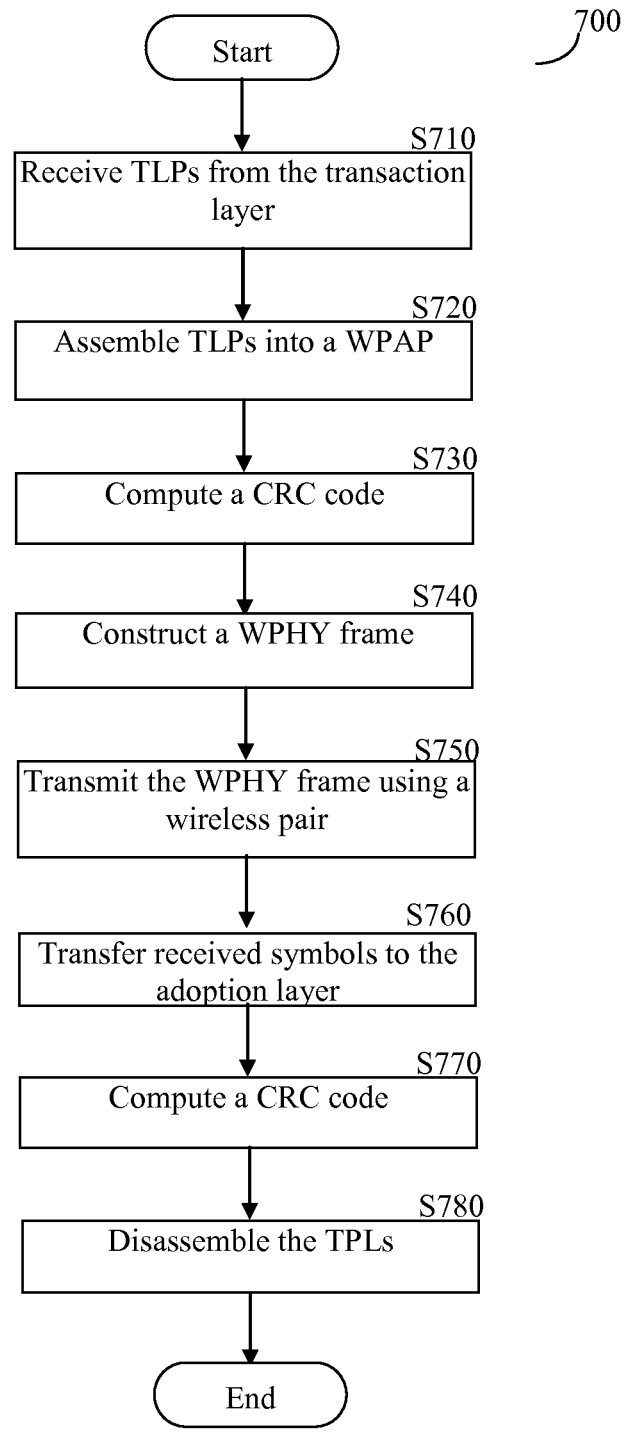
FIG. 7 is a flowchart describing the method of transporting a PCIe packet over a wireless medium.

FIG. 7 shows an exemplary and non-limiting flowchart 700 describing a method of transporting PCIe packets over a wireless medium implemented according to one embodiment of the present invention. As mentioned above, PCIe packets are sent as TLPs, where each TLP has a unique identifier that enables a response directed at the originator. At S710, the method receives TPLs from the transaction link layer 440. At S720, the TPLs are assembled into a WPAP (e.g., WPAP 500) where the data and identifier number of a TPL are together saved in the data portion of the WPAP. In accordance with one embodiment the data portion of the WPAP includes a number of 'n' TPLs, where 'n' is an integer number greater than one. At S730, once the data portion of the WPAP is completely assembled a CRC code is computed and added to the CRC field of the WPAP. At S740, the WPAP is wrapped as a data symbol and inserted to a WPHY frame (e.g., frame 550) by the WPHY layer 410. At S750, the WPHY frame is transmitted over a wireless link (e.g., link 340) using a first wireless pair of the bus to the second wireless pair which is coupled to a peripheral component.

The WPHY frame is received as a series of symbols at the WHPY layer 410 which, at S760, transfers the symbols to the wireless adaptation layer 420 as WPAPs. At S770, for each WPAP, the wireless adoption layer computes the CRC value on the data portion and compares the computed value to the value stored in the CRC field. If the CRC values are not equal, the adoption layer 420 corrects the data according to the CRC code. At S780, the TPLs in the WPAP are disassembled and forwarded to the transaction layer 430.

The invention has now been described with reference to embodiments where the wireless peripheral interconnect bus is implemented as a wireless PCIe. Other embodiments will be apparent to those of ordinary skill in the art. For example, the wireless peripheral interconnect bus can be adapted for the use with peripheral devices utilizing connection formats, such as PCIe second generation, PCIe third generation, and the like.

In an embodiment of the invention, some or all of the method components are implemented as a computer executable code. Such a computer executable code contains a plurality of computer instructions that when performed result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPUs"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Explicit use of the term CPU, "processor" or "controller" should not be construed to refer exclusively to hardware capable of executing software, and may implicitly include, without limitation, digital signal processor hardware, ROM, RAM, and non-volatile storage.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus, comprising:
    a first wireless transceiver, wherein:
        the apparatus implements a layered protocol;
        the layered protocol includes a transaction layer and a wireless adaptation layer; and
        the wireless adaptation layer is configured to function as a medium access controller (MAC) and establish wireless links between the first wireless transceiver and a second wireless transceiver by receiving transaction layer packets (TLPs) from the transaction layer and assembling the TLPs in a wireless peripheral interconnect adaptation packet (WPAP).

2. The apparatus of claim 1, wherein:
    a first wireless receiver of the first wireless transceiver and a second wireless transmitter of the second wireless transceiver communicate over a first unidirectional wireless link; and
    a second wireless receiver of the second wireless transceiver and a first wireless transmitter of the first wireless transceiver communicate over a second unidirectional wireless link.

3. The apparatus of claim 1, wherein:
    the WPAP comprises at least one of a data portion or a cyclic redundancy check (CRC) field; and
    the data portion includes a plurality of TLPs.

4. The apparatus of claim 3, further comprising a processor, wherein the processor is configured to construct the WPAP by:
    saving each TLP together with an identifier of the TLP in the data portion of the WPAP;
    computing a CRC code for the TLPs saved in the data portion; and
    inserting the CRC code in the CRC field.

5. The apparatus of claim 3, wherein:
    the layered protocol includes a wireless physical layer (WPHY);
    the WPHY constructs a WPHY frame, the WPHY frame comprises a plurality of symbols and a preamble; and
    each of the symbols comprises at least one WPAP.

6. The apparatus of claim 1, wherein:
    the first wireless transceiver is coupled to at least a first peripheral component;
    the second wireless transceiver is coupled to at least a second peripheral component; and
    each of the first peripheral component and the second peripheral component comprises a peripheral component interconnect (PCI) Express (PCIe) endpoint, a legacy endpoint, or a PCIe switch.

7. The apparatus of claim 1, wherein:
the layered protocol includes a data link layer and a physical layer; and
the data link layer, the physical layer, and the transaction layer are compliant with at least a PCIe bus.

8. The apparatus of claim 1, wherein:
the first wireless transceiver is coupled to at least a first peripheral component; and
the first peripheral component comprises a switch configured to couple a plurality of peripheral interconnect endpoints.

9. An apparatus, comprising:
a first peripheral component interconnect (PCI) Express (PCIe) component having a first wireless transceiver, wherein:
the first PCIe component is coupled to a first peripheral component; and
the apparatus implements a layered protocol including a wireless adaptation layer (WAL) and a transaction layer;
the transaction layer, at the first wireless transceiver, is configured to receive data from the first peripheral component, assemble the data into one or more transaction layer packets (TLPs), and forward the TLPs to the WAL; and
the WAL, at the first wireless transceiver, is configured to receive the TLPs from the transaction layer, and assemble the TLPs in one or more wireless peripheral interconnect adaptation packets (WPAPs).

10. The apparatus of claim 9, wherein:
the layered protocol includes a wireless physical layer (WPHY);
the WAL, at the first wireless transceiver, is further configured to forward the WPAPs to the WPHY; and
the WPHY, at the first wireless transceiver, is configured to receive the WPAPs, construct a WPHY frame including the WPAPs, and forward the WPHY frame to a second wireless transceiver.

11. The apparatus of claim 9, wherein:
the one or more WPAPs comprise at least one of a header field, a data portion, or a cyclic redundancy check (CRC) field; and
assembling the TLPs comprises including the TLPs in the data portion of the one or more WPAPs.

12. The apparatus of claim 11, wherein:
the header field comprises at least one of a source address, a destination address, a lane ID, or a peripheral component ID.

13. The apparatus of claim 10, wherein:
the WPHY frame comprises at least a preamble or a plurality of data symbols, each of the plurality of data symbols including at least one WPAP.

14. The apparatus of claim 10, further comprising a second PCIe component coupled to a second peripheral component and having the second wireless transceiver, wherein:
the WPHY, at the second wireless transceiver, is configured to receive the WPHY frame, extract the WPAPs from WPHY frame, and forward the WPAPs to the WAL;
the WAL, at the second wireless transceiver, is configured to extract the TLPs from the WPAPs, and forward the TLPs to the transaction layer; and
the transaction layer, at the second wireless receiver, is configured to extract the data from the TLPs and forward the data to the second peripheral component.

15. The apparatus of claim 14, wherein each of the first peripheral component and the second peripheral component comprises one of a peripheral component interconnect express (PCIe) endpoint, a legacy endpoint, or a PCIe switch.

16. A method for wireless communications by an apparatus, comprising:
receiving transaction layer packets (TLPs) at a wireless adaptation layer of a first component of the apparatus from a first peripheral component coupled to the first component of the apparatus, wherein the TLPs are received from a transaction layer of the first component of the apparatus; and
assembling the TLPs, at the wireless adaptation layer, in a wireless peripheral interconnect adaptation packet (WPAP).

17. The method of claim 16, further comprising:
forwarding the WPAPs to a wireless physical layer (WPHY) of the first component;
constructing a WPHY frame including the WPAPs; and
forwarding the PHY frame to a second component of the apparatus component of the apparatus coupled to a second peripheral component.

18. The method of claim 17, wherein the each of the first peripheral component and the second peripheral component comprises a peripheral component interconnect (PCI) Express (PCIe) endpoint, a legacy endpoint, or a PCIe switch.

19. The apparatus of claim 1, further comprising at least one antenna via which the first wireless transceiver establishes a wireless link with the second wireless transceiver, wherein the apparatus is configured as a computing device.

20. The apparatus of claim 9, further comprising at least one antenna via which the first wireless transceiver establishes a wireless link with the second wireless transceiver, wherein the apparatus is configured as a computing device.

* * * * *